A. McGEHEE.
LOCK NUT.
APPLICATION FILED MAR. 10, 1914.
1,110,957.
Patented Sept. 15, 1914.
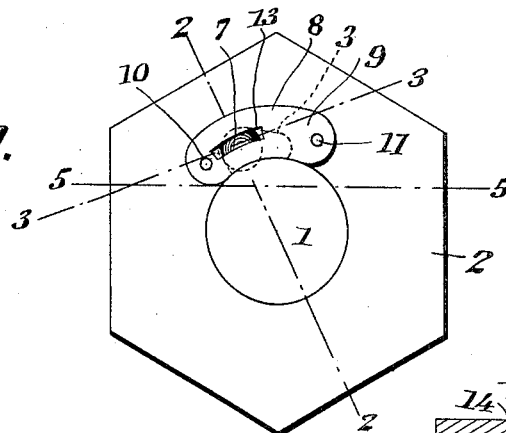
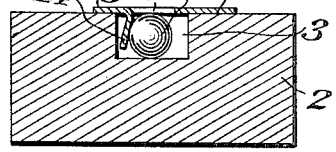
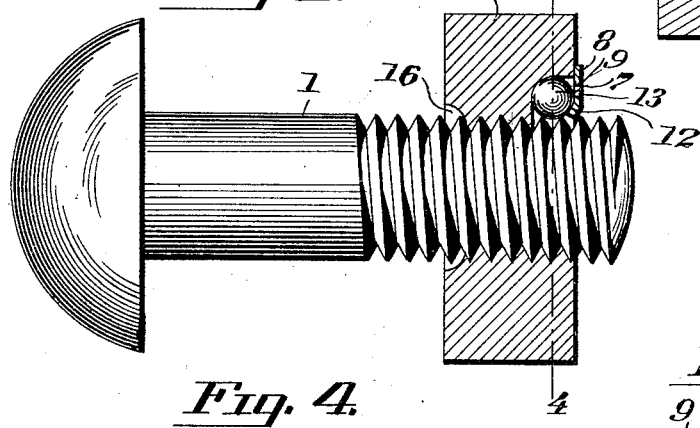
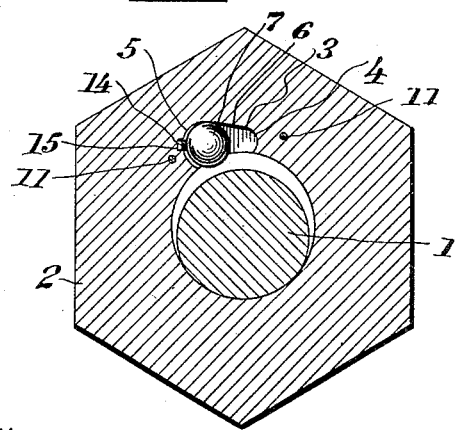
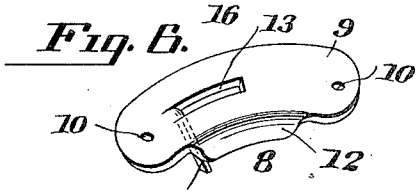
Witnesses
Inventor
Ardee McGehee
By Victor J. Evans
Attorney

UNITED STATES PATENT OFFICE.

ARDEE McGEHEE, OF SHREVEPORT, LOUISIANA.

LOCK-NUT.

1,110,957.  Specification of Letters Patent.  Patented Sept. 15, 1914.

Application filed March 10, 1914. Serial No. 823,768.

*To all whom it may concern:*

Be it known that I, ARDEE MCGEHEE, a citizen of the United States, residing at Shreveport, in the parish of Caddo and State of Louisiana, have invented new and useful Improvements in Lock-Nuts, of which the following is a specification.

The present invention relates to improvements in nut locks, one of the objects being to provide an ordinary nut with a movable element which will frictionally contact with the threads of the bolt when either the nut or the bolt is moved in an unscrewing direction to prevent the accidental separation of the nut and bolt.

Another object of the invention is to provide one of the faces of an ordinary nut with a groove or recess which communicates with its bore, the rear wall of the said depression being inclined from one of its ends to its opposite end so that one end of the said depression is shallow and the other deep, a spherical member being arranged within the depression which when disposed within the deep portion thereof contacts but does not interfere with the screwing of the nut upon the bolt, and which, by the said contact, will be drawn toward the shallow portion of the channel when the nut is rotated backwardly to tightly engage with the threads of the bolt to prevent the rotation of the bolt in such direction.

A still further object of the invention is the provision of a nut and a bolt, the nut having a depression or pocket, the rear wall of which is angular to provide the said pocket with a shallow end and a comparatively deep end, the deeper portion of the channel being of a size to receive a spherical member to retain the same in a line with the threads in its bore, and in slight frictional contact with the threads of the bolt, when the nut is screwed upon the bolt in a homeward direction, the depression or pocket being normally closed by a cap or cage, the said cap or cage having a slotted portion provided with a tongue which contacts with the spherical member and which is adapted to propel the same in the direction of the shallow end of the pocket, the cage also preventing the accidental removal of the sphere from the pocket.

With the above and other objects in view, the invention resides in the construction, combination and arrangement of parts set forth in the following specification and falling within the scope of the appended claims.

In the drawings: Figure 1 is an elevation of a nut arranged upon a bolt, the nut being provided with my improvement, Fig. 2 is a sectional view on the line 2—2 of Fig. 1, Fig. 3 is a sectional view on the line 3—3 of Fig. 1, Fig. 4 is a sectional view on the line 4—4 of Fig. 2, Fig. 5 is a similar view on the line 5—5 of Fig. 1, and Fig. 6 is a detail perspective view of the cap or cage retaining the spherical member within the pocket in the nut.

Referring now to the drawings in detail, the numeral 1 designates an ordinary bolt, and 2 an ordinary nut for the bolt. The nut 2 is formed with a depression 3 which is preferably arranged upon its outer face and which communicates with its bore. The end walls 4 and 5 of the depression are preferably rounded and the rear wall 6 is inclined from the said rounded end walls, so that the depression, at its end 5, is comparatively deep while at its end 4 the depression is comparatively shallow.

The depression 3 is adapted to serve as a pocket for the reception of a spherical member or ball 7 which is preferably constructed of some hardened metal, such as Harveyized or Krupp steel. The ball 7 when arranged at the deep end 5 of the pocket is in a position to be lightly contacted by the threads of the bolt, the said contact being only sufficient to revolve the ball within the rounded end of of the pocket, when the nut or bolt is rotated in a homeward screwing direction. When either the nut or bolt is rotated to separate the one from the other, the ball will be moved by the contact with the threads of the bolt toward the shallow end 4 of the pocket, and as a consequence afford a tight engagement between the same and the rear wall of the pocket, to prevent the movement of the nut or bolt in such an unscrewing direction.

To retain the ball 7 within the pocket I employ a cap or cage 8 which includes a top plate 9 of a size sufficient to fully close the pocket, the said plate being provided with openings 10 adjacent its ends through which pass retaining elements 11 which enter suitable openings provided therefor in the nut 2. The top plate 9 has its inner edge arranged at the bore of the nut and rounded to conform with the shape of the said bore and the said edge at a suitable distance from the ends of the plate is bent downwardly to provide an apron 12. This apron is of a length corresponding to the length of the pocket, but only sufficiently contacts with the upper portion of the ball to prevent the same escaping from the pocket.

The plate 9 is provided with a longitudinal opening 13, the said opening being formed by slitting the plate transversely and at spaced intervals toward the said transverse slit, the metal between the slits being bent downwardly to provide a spring tongue 14, and the said tongue is adapted to be disposed in the deep end of the pocket, a slot 15 being provided in the wall 5 of the pocket to receive the said tongue when the ball is arranged in the position illustrated in Figs. 1, 3 and 4 of the drawings. This tongue is adapted to contact with the ball and project the same within the pocket toward the shallow end 4 thereof. The opening 13 provides a means whereby a pointed instrument may be inserted within the pocket to force the ball from the shallow end of the pocket toward the deep end thereof, such instrument being held in contact with the ball when it is desired to separate the nut from the bolt. The inner face of the nut is preferably formed with an annular depression which communicates with its bore, the said depression being indicated by the numeral 16 and being devised as a means for directing the threads of the bolt to the threaded bore of the nut.

From the above description, taken in connection with the accompanying drawings, the simplicity of the device, as well as the advantages thereof will, it is thought, be perfectly apparent to those skilled in the art to which such invention appertains without further detailed description.

Having thus described the invention, what I claim is:

1. A bolt and a nut therefor, said nut having one of its faces formed with a pocket which communicates with its bore and which has an inclined rear wall to provide one of the ends of the pocket of a greater depth than its opposite end, a spherical member within the pocket adapted to be contacted by the threads of the bolt to retain the same within the deep portion of the pocket when the nut is screwed in one direction upon the bolt, a plate arranged upon the outer face and closing the pocket, said plate having a tongue arranged within the bore of the nut and contacting with the ball.

2. A bolt and a nut therefor, said nut having one of its faces formed with a pocket which communicates with its bore and which has an inclined rear wall to provide one of the ends of the pocket of a greater depth than at the opposite end, a spherical member within the pocket and contacting with the rear wall thereof, a plate arranged over the pocket and upon the nut, said plate having an apron arranged within the pocket at the bore of the nut and contacting with the spherical member, and a spring arranged within the pocket and adapted for projecting the spherical member from the deep toward the shallow end of the pocket and into frictional engagement with the threads of the bolt.

3. A bolt and a nut therefor, said nut having one of its faces formed with a pocket which communicates with its bore and which has an inclined rear wall to provide one of the ends of the pocket of a greater depth than the depth of the opposite end, and a ball within the pocket and contacting with the rear wall thereof, a plate secured to the nut and closing the pocket, said plate having an inwardly extending apron which extends within the pocket in the bore of the nut and which engages with the ball to retain the ball within the pocket, the plate being slitted to provide a spring tongue, the said tongue being arranged within the pocket and adapted to contact with the ball to force the same from the deep end of the pocket toward the shallow end thereof.

4. A bolt and a nut therefor, said nut having a pocket which communicates with its bore, said pocket having incurved end walls, one of which is of a greater width than the second wall and an inclined rear wall connecting the end walls, the deeper end of the pocket being formed with a notch, a spherical member within the pocket and engaging with the rear wall thereof, a plate having an inner curved edge secured to the nut and closing the pocket, said inner curved edge of the plate having an inwardly extending apron which is arranged within the pocket at the bore of the nut and which contacts with the spherical member to limit the movement of the said member within the pocket, the said plate having an elongated opening, one of the end walls of which is formed with an inturned spring tongue which is extended within the pocket and which rests within the notch in the deeper end of the pocket when the ball is arranged in the said deep end and which is adapted to project the ball toward the reduced end of the pocket to force the same into tight engagement with the threads of the bolt.

5. In combination with a bolt and a nut therefor, said nut having a pocket which communicates with its bore, and a movable lock arranged within the pocket, of a plate secured to the nut over the pocket, said plate being constructed of spring material and being slitted, and the portion of the metal between the slits being bent to within the pocket to provide a spring tongue which contacts with and projects the locking element into engagement with the threads of the bolt.

In testimony whereof I affix my signature in presence of two witnesses.

ARDEE McGEHEE.

Witnesses:
 GEO. B. PINCHERA,
 H. G. FORD.

Copies of this patent may be obtained for five cents each, by addressing the "Commissioner of Patents, Washington, D. C."